United States Patent
Keshavarzian et al.

(10) Patent No.: US 7,720,465 B2
(45) Date of Patent: May 18, 2010

(54) SYSTEM, METHOD AND APPARATUS EMPLOYING TONES AND/OR TONE PATTERNS TO INDICATE THE MESSAGE TYPE IN WIRELESS SENSOR NETWORKS

(75) Inventors: Abtin Keshavarzian, Palo Alto, CA (US); Lakshmi Venkatraman, Mountain View, CA (US); Dhananjay Lal, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 609 days.

(21) Appl. No.: 11/607,697

(22) Filed: Nov. 30, 2006

(65) Prior Publication Data

US 2008/0132211 A1    Jun. 5, 2008

Related U.S. Application Data

(63) Continuation-in-part of application No. 11/239,837, filed on Sep. 30, 2005, now Pat. No. 7,536,194.

(51) Int. Cl.
*H04L 12/28* (2006.01)
*H04L 29/08* (2006.01)

(52) U.S. Cl. ............ 455/414.1; 370/350; 370/254

(58) Field of Classification Search ............ 455/7, 455/418, 420, 515, 556.1, 414.1; 370/350, 370/254, 328, 338, 401, 501, 503, 540; 340/426.25, 340/540

See application file for complete search history.

(56) References Cited

U.S. PATENT DOCUMENTS

| | | | |
|---|---|---|---|
| 5,392,287 A | 2/1995 | Tiedemann, Jr. et al. | |
| 6,421,354 B1 | 7/2002 | Godlewski | |
| 6,590,893 B1 | 7/2003 | Hwang et al. | |
| 7,158,049 B2 * | 1/2007 | Hoefel et al. | 340/855.7 |
| 2006/0120303 A1 * | 6/2006 | Yarvis et al. | 370/254 |
| 2006/0209715 A1 * | 9/2006 | Kushalnagar et al. | 370/254 |
| 2006/0250236 A1 * | 11/2006 | Ackley et al. | 340/540 |
| 2006/0273896 A1 * | 12/2006 | Kates | 340/539.18 |
| 2007/0076650 A1 * | 4/2007 | Manjeshwar et al. | 370/328 |
| 2007/0077951 A1 * | 4/2007 | Manjeshwar et al. | 455/515 |
| 2007/0140303 A1 * | 6/2007 | Kim et al. | 370/503 |
| 2007/0229237 A1 * | 10/2007 | Kates | 340/426.25 |
| 2008/0049700 A1 * | 2/2008 | Shah et al. | 370/342 |

OTHER PUBLICATIONS

International Search Report for PCT/US 07/23712, Date Apr. 21, 2008.

* cited by examiner

*Primary Examiner*—Blane J Jackson
(74) *Attorney, Agent, or Firm*—Kenyon & Kenyon LLP

(57) ABSTRACT

A system and method for operating a wireless network provides for sending a wakeup tone, periodically waking up from a sleep mode to listen for the wakeup tone, upon receiving the wakeup tone, listening for at least one second tone, the at least one second tone being one of (i) a tone in a frequency different from the wakeup tone and (ii) a pattern of tones including at least one frequency different from the wakeup tone, and upon receiving the at least one second tone, performing an action based on the at least one second tone.

14 Claims, 6 Drawing Sheets

Example of wakeup schedule

SYSTEM, METHOD AND APPARATUS EMPLOYING TONES AND/OR TONE PATTERNS TO INDICATE THE MESSAGE TYPE IN WIRELESS SENSOR NETWORKS

CROSS-REFERENCE TO RELATED APPLICATION

This application claims the benefit under 35 U.S.C. §120, and is a Continuation-in-Part Application, of prior U.S. patent application Ser. No. 11/239,837, filed Sep. 30, 2005, which issued as U.S. Pat. No. 7,536,194 on May 19, 2009.

FIELD OF THE INVENTION

The present invention relates to a system, method and apparatus employing frequency tones and/or tone patterns to indicate the message type in wireless sensor networks.

BACKGROUND INFORMATION

In wireless sensor networks, to save energy the nodes may perform a radio-frequency (RF) wakeup procedure, in which during a majority of the time the nodes are in a power down mode, and in which, periodically, the nodes wake up to sample the wireless channel for any signal, and if a signal is present they remain in an active mode to receive the message. In this regard, the signal may followed by a message, the type of which indicates the action or actions that are required to be performed by the awakened node after the wakeup, and in certain instances it may be essential that the type is known correctly by the awakened node before the actual packet exchange. Since a node may be simultaneously awakened by multiple nodes in the network, there is a chance that interference and/or collisions may occur.

SUMMARY OF THE INVENTION

According to an exemplary embodiment and/or exemplary method of the present invention, a particular type of tone, or a pattern of tones, is sent after the wakeup tone and before any packet exchange to indicate the particular action or actions that are required to be performed by the awakened node. Here, for example, the particular frequency of the tone may indicate a type of the message. In this way, the awakened node may determine the message type even when there are multiple transmitters sending at the same time.

An exemplary embodiment of the present invention is directed to a method of operating a wireless network, the method including sending a wakeup tone, periodically waking up from a sleep mode to listen for the wakeup tone, upon receiving the wakeup tone, listening for at least one second tone, the at least one second tone being one of (i) a tone in a frequency different from the wakeup tone and (ii) a pattern of tones including at least one frequency different from the wakeup tone, and upon receiving the at least one second tone, performing an action based on the at least one second tone.

Another exemplary embodiment of the present invention is directed to a method of operating a wireless network, in which the at least one second tone indicates a message type.

Yet another exemplary embodiment of the present invention is directed to a method of operating a wireless network, in which the action includes at least one of receiving a first message, sending the wakeup tone to another node in the wireless network and transmitting a second message.

Still another exemplary embodiment of the present invention is directed to a method of operating a wireless network, in which the second message includes a sensor reading.

Yet another exemplary embodiment of the present invention is directed to a method of operating a wireless network, in which the wakeup tone is sent simultaneously by more than one node of the wireless network.

Still another exemplary embodiment of the present invention is directed to a method of operating a wireless network, in which the at least one second tone includes a tone transmitted from each of at least two nodes of the wireless network.

Yet another exemplary embodiment of the present invention is directed to a method of operating a wireless network, in which the at least one second tone includes a first tone and a second tone transmitted simultaneously, the first tone being transmitted by a first node and the second tone being transmitted by a second node.

Still another exemplary embodiment of the present invention is directed to a method of operating a wireless network, in which the at least one second tone includes a first pattern of tones and a second pattern of tones transmitted simultaneously, the first pattern being transmitted by a first node and the second pattern being transmitted by a second node.

Yet another exemplary embodiment of the present invention is directed to a method of operating a wireless network, in which the first pattern is different from the second pattern.

An exemplary embodiment of the present invention is directed to a wireless network, which includes a receiver node that includes an arrangement to receive a plurality of tones each at a predefined frequency, an energy storage arrangement, and a control arrangement to operate the receiver node in a sleep mode to conserve energy, the receiver node being configured to periodically wake up from the sleep mode to listen for a wakeup tone, and upon receiving the wakeup tone, listening for at least one second tone, the at least one second tone being one of (i) a tone in a frequency different from the wakeup tone and (ii) a pattern of tones in at least one frequency different from the wakeup tone.

Another exemplary embodiment of the present invention is directed to a wireless network, in which the receiver node further includes an arrangement to perform an action based on the at least one second tone.

Yet another exemplary embodiment of the present invention is directed to a wireless network, in which the receiver node includes at least one of a sensor and an actuator.

Still another exemplary embodiment of the present invention is directed to a wireless network, which includes at least one transmitter node to transmit the wakeup tone and the at least one second tone.

Yet another exemplary embodiment of the present invention is directed to a wireless network, in which the at least one transmitter node includes at least two transmitter nodes, at least one of which transmits the wakeup tone, and each of which simultaneously transmit at least one further tone distinct from one another to collectively form the at least one second tone received by the receiver node.

Still another exemplary embodiment of the present invention is directed to a wireless network, in which the at least two transmitter nodes include a first transmitter node that transmits the at least one further tone as a single tone at a first predefined frequency, and a second transmitter node that transmits the at least one further tone as a single tone at a second predefined frequency different from the first predefined frequency.

Yet another exemplary embodiment of the present invention is directed to a wireless network, in which the at least two transmitter nodes include a first transmitter node that transmits the at least one further tone as plurality of tones in a first pattern, and a second transmitter node that transmits the at least one further tone as a plurality of tones in a second pattern different from the first pattern.

Still another exemplary embodiment of the present invention is directed to a wireless node, which includes a power storage arrangement, and an arrangement to receive a plurality of tones each at a predefined frequency, the wireless node being configured to periodically listen for a wakeup tone, and upon receiving the wakeup tone, listening for at least one second tone, the at least one second tone being one of (i) a tone in a frequency different from the wakeup tone and (ii) a pattern of tones that includes at least one frequency different from the wakeup tone.

Still another exemplary embodiment of the present invention is directed to a wireless node, which includes an arrangement to perform an action based on the at least one second tone.

Yet another exemplary embodiment of the present invention is directed to a wireless node, in which the at least one second tone includes a first tone and a second tone transmitted simultaneously, the first tone being transmitted by a first node and the second tone being transmitted by a second node.

Still another exemplary embodiment of the present invention is directed to a wireless node, in which the at least one second tone includes a first pattern of tones and a second pattern of tones transmitted simultaneously, the first pattern being transmitted by a first node and the second pattern being transmitted by a second node.

DETAILED DESCRIPTION

A wireless sensor network may be defined, for example, as a distributed system of nodes/motes each equipped with a radio transceiver, a microcontroller and one or more sensors and/or actuators. The nodes in such a network may be small and inexpensive, and consequently the resources provided with each node may be necessarily limited. For example, the wireless nodes of a network may be equipped with a limited energy source, in particular, the wireless nodes may be battery-operated.

Figure 1:
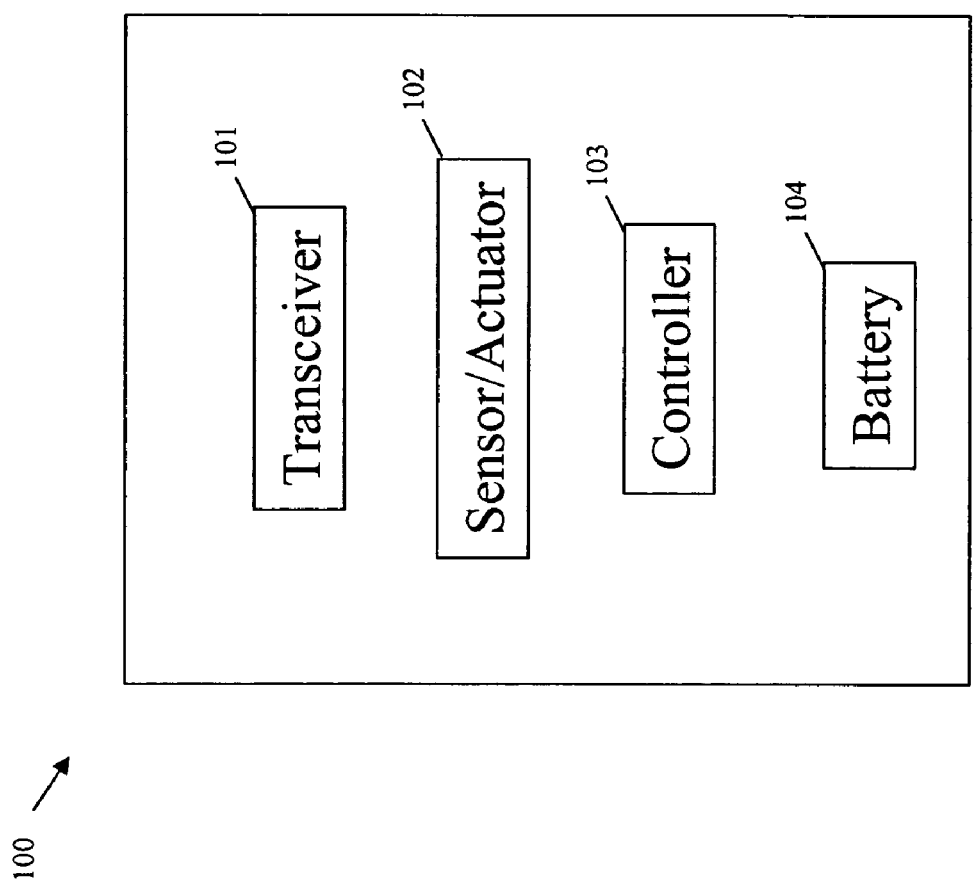
FIG. 1 shows an exemplary wireless node, which operates according to alternating sleep and wake cycles.

FIG. 1 shows an exemplary wireless node 100, which operates according to alternating sleep and wake cycles. The exemplary wireless node 100 includes a radio transceiver 101, a sensor and/or actuator 102, a microcontroller 103 and a battery 104. The radio transceiver 101 enables the exemplary wireless node 100 to send and/or receive wireless transmissions. The sensor and/or actuator 102 senses a condition, and/or actuates a movement of an element. The microcontroller 103 controls the radio transceiver 101 and the sensor and/or actuator 102, or other aspects of the exemplary wireless node 100. The battery 104 provides energy to power the components of the exemplary wireless node 100.

The design of a wireless sensor network for energy constrained nodes may be dictated by longevity concerns. One approach to increase the longevity of a wireless sensor network with energy constrained nodes is to use a sleep schedule where the nodes operate in a low-power or sleep mode for most of the time, periodically waking up to check for activity.

Figure 2:
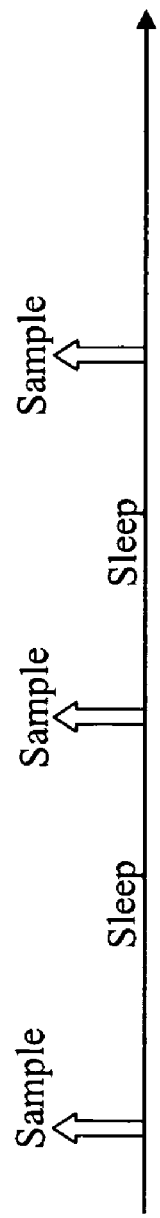
FIG. 2 shows an exemplary wakeup schedule for an energy constrained node of a wireless sensor network.

FIG. 2 shows an exemplary wakeup schedule for an energy constrained node of a wireless sensor network, in which the node operates in the sleep mode most of the time, and which periodically wakes up for a brief time period to take a sample.

Channel Sniffing and Wakeup

The nodes in a wireless network may wake up from time to time and scout the channel for activity. This may be performed, for example, by listening to the channel for a very short period of time and measuring the received signal strength. If the signal strength exceeds a predetermined threshold, the node may remain awake in an attempt to receive a possible transmission, otherwise the node may power itself down to conserve energy. Such a process is sometimes referred to as "sniffing the channel".

The length of the sniffing period and the energy consumed while performing a wakeup may determine the longevity of the network. In practice, the sniffing length is determined, at least in part, by several hardware limitations such as the warm up time of the radio, and the minimum time required to reliably detect a signal in the channel. The sniffing period may be on the order of hundreds of micro-seconds to a few milli-seconds.

Wakeup Schedule

The time at which each node in the network "sniffs" the channel may be determined by a wakeup schedule. Here, for example, the wakeup schedule may be deterministic or random. Moreover, the wakeup schedule may also be different for one or more nodes of the network. In this regard, having differing schedules may provide different delay guarantees for the messages in the network.

Figure 3A:
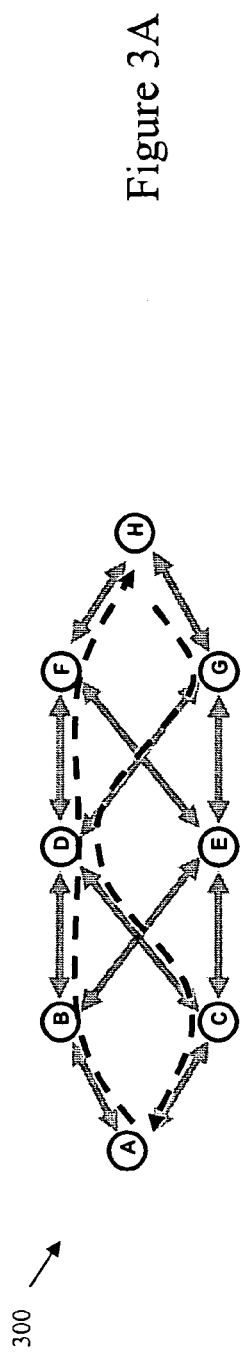
FIG. 3A shows an arrangement of exemplary nodes of an exemplary wireless network, and how the exemplary nodes might communicate messages to one another.
Figure 3B:
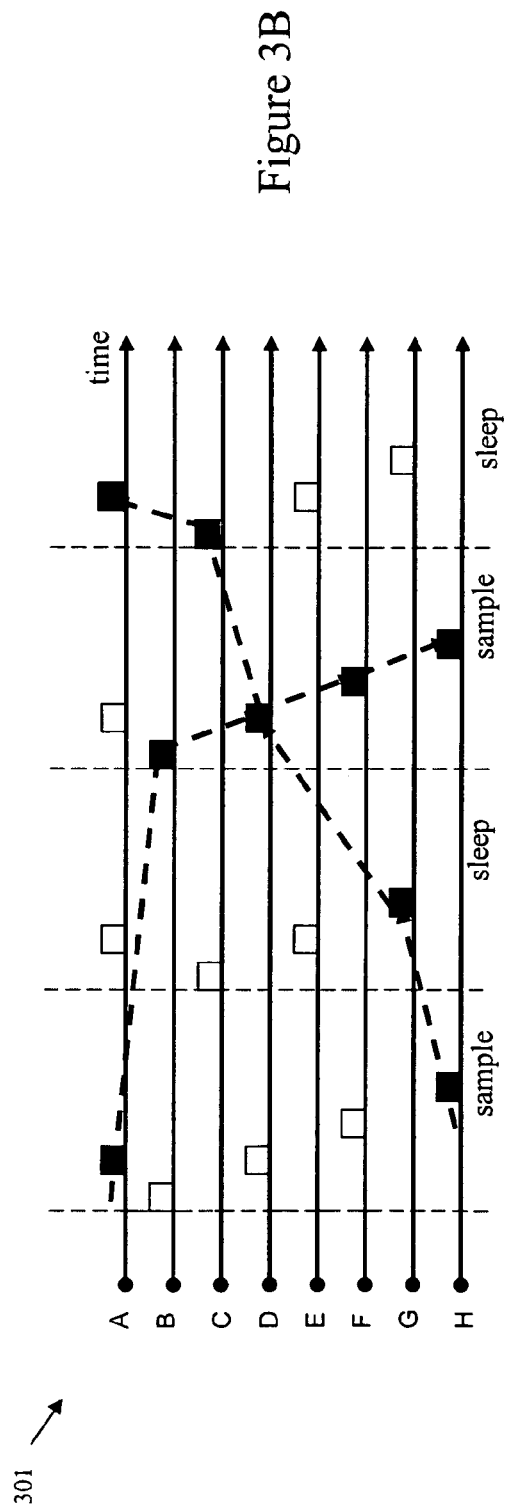
FIG. 3B shows an exemplary schedule to wakeup the exemplary nodes of FIG. 3A, and how the exemplary schedule effects the transmissions of messages between the nodes.

FIGS. 3A and 3B show exemplary nodes A through H of an exemplary wireless network 300, and an exemplary schedule 301 to wakeup the exemplary nodes A through H. In particular, FIG. 3A shows how the exemplary nodes A through H of the exemplary wireless network may communicate with each other. For example, FIG. 3A shows the following: node A can communicate directly with nodes B and C; node B can communicate directly with nodes D and E; node C can communicate directly with nodes A, D and E; node D can communicate directly with nodes B, C, F and G; node E can communicate directly with nodes B, C, F and G; node F can communicate directly with nodes D, E and H; node G can communicate directly with nodes D, E and H; and node H can communicate directly with nodes F and G. Such a relationship is shown in FIG. 3A by shaded arrows between the nodes.

FIG. 3A also shows (via a dashed line) the transmission of a message from node A to node H, and the transmission of a message from node H to node A. In particular, the message transmitted from node A to node H is first transmitted from node A to node B, and then transmitted from node B to node D, and then transmitted from node D to node F, and then transmitted from node F to node H. Similarly, but not in identical fashion, the message transmitted from node H to node A is first transmitted from node H to node G, and then transmitted from node G to node D, and then transmitted from node D to node B, and then transmitted from node B to node A. Here, it is noted that the path of the two transmitted messages between nodes A and H is different, although not restricted as such.

FIG. 3B shows an exemplary wakeup schedule 301 for each of the exemplary nodes A through H. Here, a square box represents the time at which the particular exemplary node samples the channel. In this regard, an unfilled white square box indicates that at the sample time there was no activity to be performed by the exemplary node and therefore the exemplary node immediately returned sleep, while a filled black square box indicates that at the sample time there was an activity (e.g., message transmission and/or receipt) to be performed, and therefore the exemplary node stayed awake to perform the activity.

FIG. 3B also shows (via dashed lines) the wakeup sequence timing required for the transfer of the messages depicted in FIG. 3A. Here, the first dashed line representing the wakeup sequence timing required for the message transferred from node A to node H first intersects a sample period for node A, and thereafter intersects the next sample period for node B, and thereafter intersects the next sample period for node D, and thereafter intersects the next sample period for node F, and thereafter intersects the next sample period for node H. The second dashed line representing the wakeup sequence timing required for the message transferred from node H to node A first intersects a sample period for node H, and thereafter intersects the next sample period for node G, and thereafter intersects the next sample period for node D, and thereafter intersects the next sample period for node C, and thereafter intersects the next sample period for node A.

It is noted, for example, with respect to FIG. 3B that the two dashed lines intersect the same sampling period for node D. This represents an example scenario where node D is awakened by two different nodes for two different reasons. That is, node D is awakened by node B to pass along a message to node F, and, at the same time, node D is awakened by node G to pass along a message to node C.

Message Type

As demonstrated above, a node in the network may be awakened for different reasons and by different nodes in the network. According to one exemplary embodiment, the type of the message that follows the wakeup tone may determine the actions that need to be performed by the awakened node after the wakeup.

Determining the type of the message may be essential in many cases, and may change the way the message is received and/or decoded by the node. Depending on the application scenario, the type of the message may include transmitter information (e.g., who has awakened the node), the message route (e.g., who the node should forward the message to), the data content or packet length (e.g., what size of packet should the node expect), or even the priority level of message (e.g., how important the message is). For example, the type of the message may indicate the message route, so that the node knows that for the next step which of its neighbors should be awakened. Another example is the case of messages from mobile nodes. Messages from mobile nodes may have a different format and/or may be on a different frequency channel.

It is noted, for example, that a node may be awakened at the same time by multiple nodes for multiple purposes. For example, a mobile node and stationary node may awaken a node at the same time. It may be essential, therefore, that the node determine why it has been awakened even when it is simultaneously awakened by multiple nodes.

Using the Type Tone After the Wakeup Tone

According to an exemplary embodiment of the present invention, a "type tone" (or more generally a pattern of type tones) is transmitted immediately after the wakeup tone to indicate the type of the message and essentially the reason that the node has been awakened.

Figure 4:
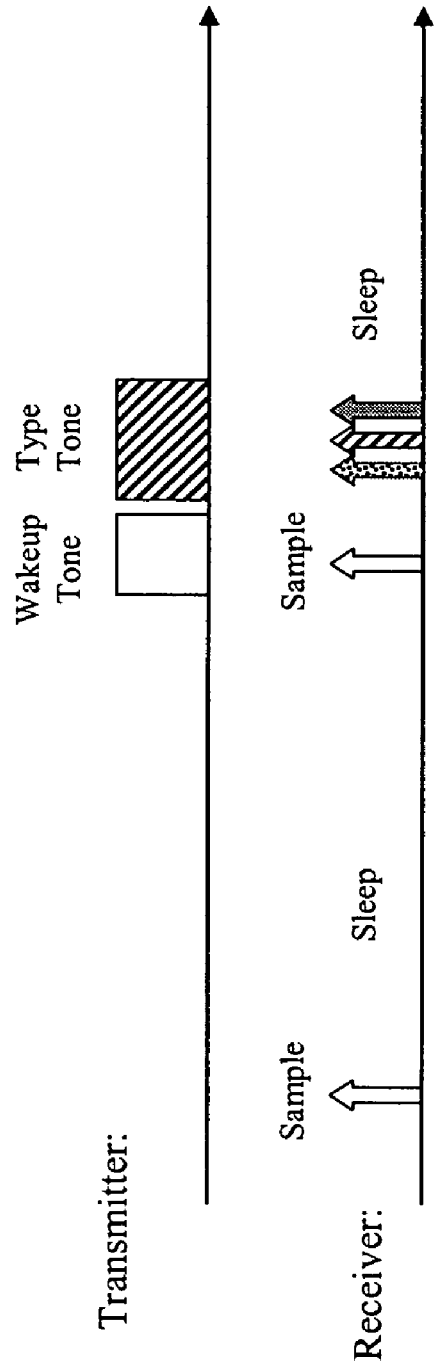
FIG. 4 shows an exemplary embodiment to use a type tone.

FIG. 4 shows an exemplary embodiment of using a type tone. A transmitter sends a wakeup tone (at the time that the receiver is sampling the channel) in the wakeup frequency, and shortly thereafter the transmitter follows the wakeup tone with the "type tone". According to an exemplary embodiment, the frequency on which the type tone is sent indicates the type of the message.

At the receiver side, the node samples the channel (in the wakeup frequency) regularly and/or periodically. If a high signal is detected, the node stays in the receive mode and switches to different frequencies and samples different tone frequencies. In FIG. 4, for example, the node samples three different frequencies, each of which corresponds to a different message type. In this way, the receiver can determine the type of the message. Essentially, the presence of a high signal in a pre-specified frequency channel is used to communicate the type of the message to the receiver.

An advantage of using the type tone after the wakeup tone is its resilience to a collision condition. Since the receiver only checks the signal power, the collision of different transmitters may not have any effect on the signal. That is, if two nodes send two tones at the same time, the received power is only increased at the receiver. Additionally, if the node is awakened by multiple nodes for different message types, the node may detect all the different types and then act accordingly based on the priority level assigned to different message types.

Pattern of Tones

According to another exemplary embodiment, instead of using a single tone, a pattern of tones in different frequencies may be used to indicate different message types. Such an exemplary method may be helpful when there are many different types.

Figure 5:
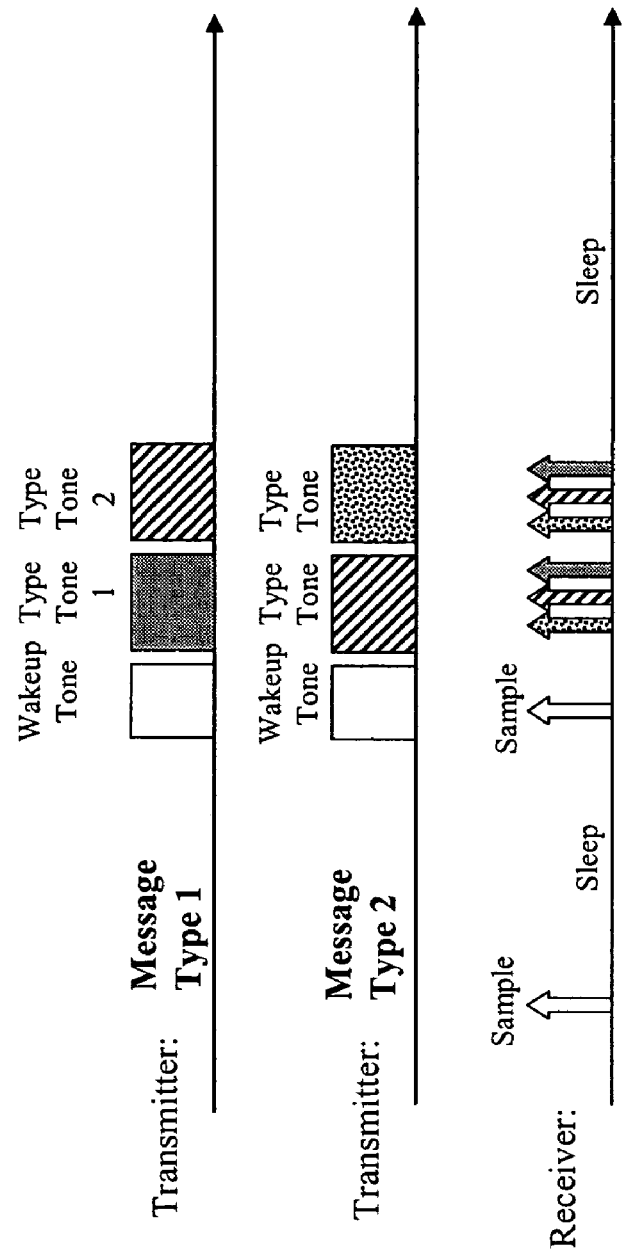
FIG. 5 shows an exemplary embodiment to use a pattern of tone to indicate a message type.

FIG. 5 shows an exemplary embodiment of using a pattern of tone to indicate a message type. Here, the pattern is a sequence of two type tones, each of which is selected from three possible tones. The receivers sample for the three possible frequencies during each tone period. Hence, a total of 3×3=9 different types is provided using this exemplary model. By increasing the length of the tone pattern the probability of false wakeups may be reduced. That is, the probability that noise or interference awaken the node and create a correct message type pattern.

As can be seen in FIG. 5, the exemplary embodiment of the present invention allows a node to simultaneously receive messages from multiple nodes of the network without collisions occurring. That is, with the exemplary method of the present invention, messages received simultaneously by a node may be easily distinguished.

A Combined Approach

Figure 6:
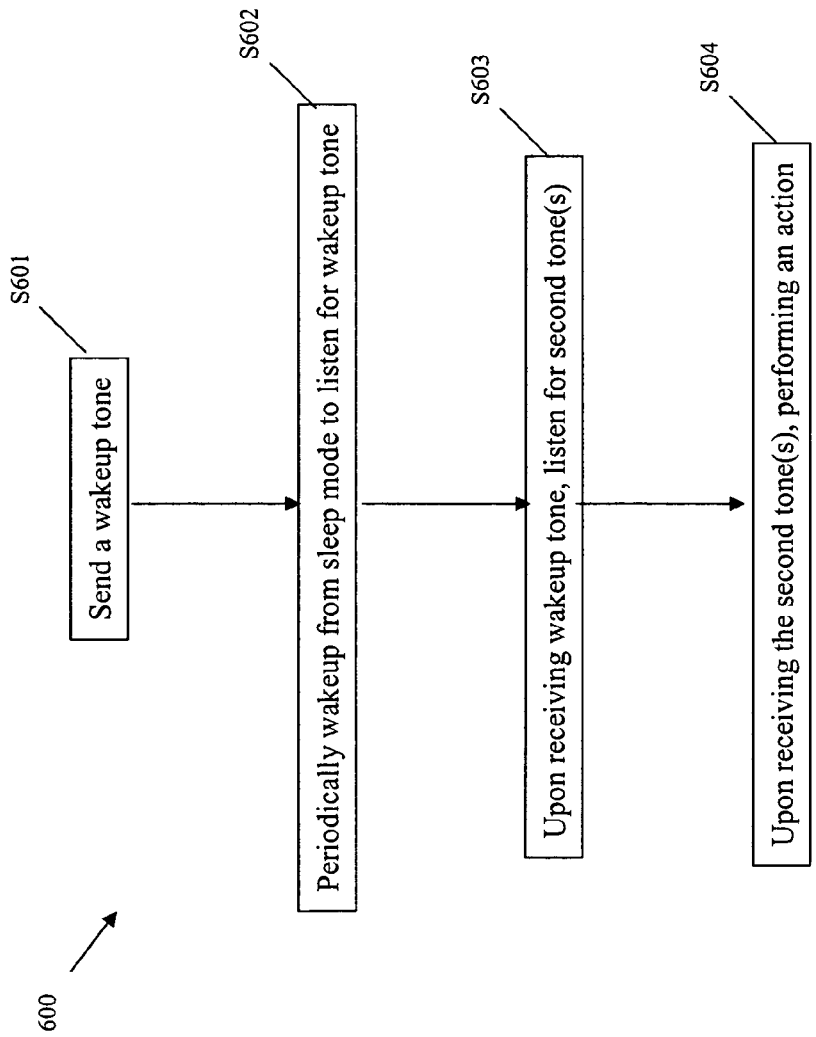
FIG. 6 shows an exemplary method for operating a wireless network.

FIG. 6 shows an exemplary method 600 for operating a wireless network. In this regard, the wireless network may be, for example, a network like the exemplary wireless network 300 shown in FIG. 3A. The exemplary method 600 is described as follows.

In step S601, a wakeup tone is sent a node in the wireless network. In this regard, the node may be, for example, a wireless sensor node and/or an actuator node, which may or may not be constrained as to a certain resource (e.g., a battery-operated node). In particular, the node may be selected, for example, from one or more the exemplary nodes A through H shown in FIG. 3A. Moreover, the wakeup tone may be sent exclusively by a single node of the wireless network, or alternatively, the wakeup tone may be sent simultaneously by more than one node of the wireless network.

In step S602, the node is periodically woken up from a sleep mode to listen for the wakeup tone. Here, for example, the node may be woken up according to a particular schedule, such as the exemplary wakeup schedule 301 shown in FIG. 3B.

In step S603, upon receiving the wakeup tone, the node listens for at least one second tone, the at least one second tone being one of (i) a tone in a frequency different from the wakeup tone and (ii) a pattern of tones including at least one frequency different from the wakeup tone. Here, for example, the at least one second tone may indicate a message type. In this regard, the at least one second tone may include tones sent exclusively by a single node of the wireless network, or alternatively, the at least one second tone may includes tones transmitted from each of at least two separate nodes of the wireless network. For example, the at least one second tone may include a first tone and a second tone transmitted simultaneously, the first tone being transmitted by a first node and the second tone being transmitted by a second node. In this regard, the at least one second tone may include, for example, a first pattern of tones and a second pattern of tones transmitted simultaneously, the first pattern being transmitted by a first node and the second pattern being transmitted by a second node. Moreover/still, the first pattern may be different from the second pattern In step S603, upon receiving the at least one second tone, the node performs an action based on the at least one second tone. Here, for example, the action may include receiving a message, sending the wakeup tone to another node in the wireless network and/or transmitting a message (e.g., a message that includes a sensor reading).

What is claimed is:

1. A method of operating a wireless network, the method including:
   sending, by at least one transmitter node, a wakeup tone and at least one second tone, the at least one second tone being one of (i) a tone in a frequency different from the wakeup tone and (ii) a pattern of tones in at least one frequency different from the wakeup tone;
   operating a receiver node in a sleep mode to conserve energy;
   periodically waking up, by the receiver node, from the sleep mode to listen for the wakeup tone;
   upon receiving the wakeup tone, listening, by the receiver node, for the at least one second tone; and
   upon receiving the at least one second tone, performing an action based on the at least one second tone;
   wherein the at least one transmitter node includes at least two transmitter nodes, at least one of which transmits the wakeup tone, and each of which simultaneously transmits at least one further tone distinct from one another to collectively form the at least one second tone received by the receiver node.

2. The method of claim 1, wherein the at least one second tone indicates a message type.

3. The method of claim 1, wherein the action includes at least one of receiving a first message, sending the wakeup tone to another node in the wireless network and transmitting a second message.

4. The method of claim 3, wherein the second message includes a sensor reading.

5. The method of claim 1, wherein the wakeup tone is sent simultaneously by more than one node of the wireless network.

6. The method of claim 1, wherein the at least two transmitter nodes include a first transmitter node that transmits the at least one further tone as a plurality of tones in a first pattern, and a second transmitter node that transmits the at least one further tone as a plurality of tones in a second pattern different from the first pattern.

7. A wireless network, comprising:
   a receiver node that includes:
      an arrangement to receive a plurality of tones each at a predefined frequency;
      an energy storage arrangement; and
      a control arrangement to operate the receiver node in a sleep mode to conserve energy; and
   at least one transmitter node to transmit a wakeup tone and at least one second tone, the at least one second tone being one of (i) a tone in a frequency different from the wakeup tone and (ii) a pattern of tones in at least one frequency different from the wakeup tone;
   wherein:
      the receiver node is configured to periodically wake up from the sleep mode to listen for the wakeup tone, and, upon receiving the wakeup tone, listen for the at least one second tone; and
      the at least one transmitter node includes at least two transmitter nodes, at least one of which transmits the wakeup tone, and each of which simultaneously transmits at least one further tone distinct from one another to collectively form the at least one second tone received by the receiver node.

8. The wireless network of claim 7, wherein the receiver node further includes an arrangement to perform an action based on the at least one second tone.

9. The wireless network of claim 8, wherein the receiver node includes at least one of a sensor and an actuator.

10. The wireless network of claim 7, wherein the at least two transmitter nodes include a first transmitter node that transmits the at least one further tone as a single tone at a first predefined frequency, and a second transmitter node that transmits the at least one further tone as a single tone at a second predefined frequency different from the first predefined frequency.

11. The wireless network of claim 7, wherein the at least two transmitter nodes include a first transmitter node that transmits the at least one further tone as plurality of tones in a first pattern, and a second transmitter node that transmits the at least one further tone as a plurality of tones in a second pattern different from the first pattern.

12. A wireless node, comprising:
   a power storage arrangement;
   an arrangement to receive a plurality of tones each at a predefined frequency; and
   at least one transmitter node to transmit a wakeup tone and at least one second tone;
   wherein:
      the wireless node is configured to periodically listen for the wakeup tone, and upon receiving the wakeup tone, listening for the at least one second tone, the at least one second tone being one of (i) a tone in a frequency different from the wakeup tone and (ii) a pattern of tones that includes at least one frequency different from the wakeup tone; and the at least one transmitter node includes at least two transmitter nodes, at least one of which transmits the wakeup tone, and each of which simultaneously transmits at least one farther tone distinct from one another to collectively form the at least one second tone received by a receiver node.

13. The wireless node of claim 12, further comprising:
an arrangement to perform an action based on the at least one second tone.

14. The wireless node of claim 12, wherein the at least two transmitter nodes include a first transmitter node that transmits the at least one further tone as a plurality of tones in a first pattern, and a second transmitter node that transmits the at least one further tone as a plurality of tones in a second pattern different from the first pattern.

* * * * *